(No Model.)
H. & B. DRÄGER.
RECEPTACLE FOR PRESERVING, TRANSPORTING, AND SELLING BEER, &c.
No. 572,248. Patented Dec. 1, 1896.
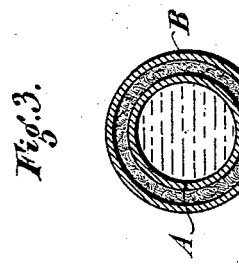
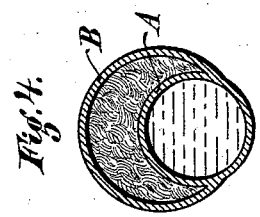
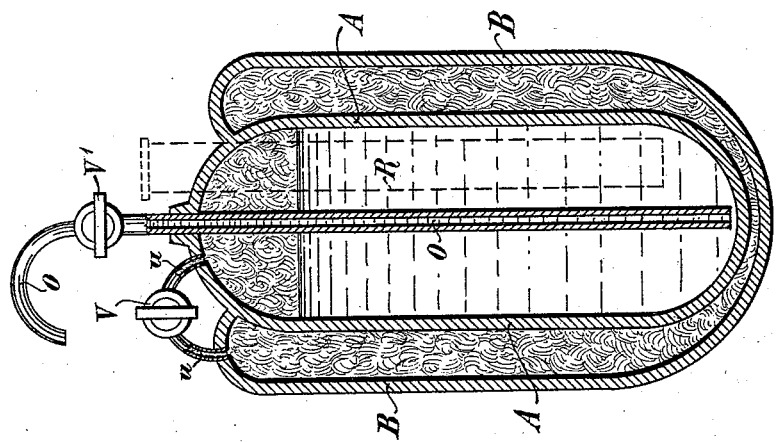
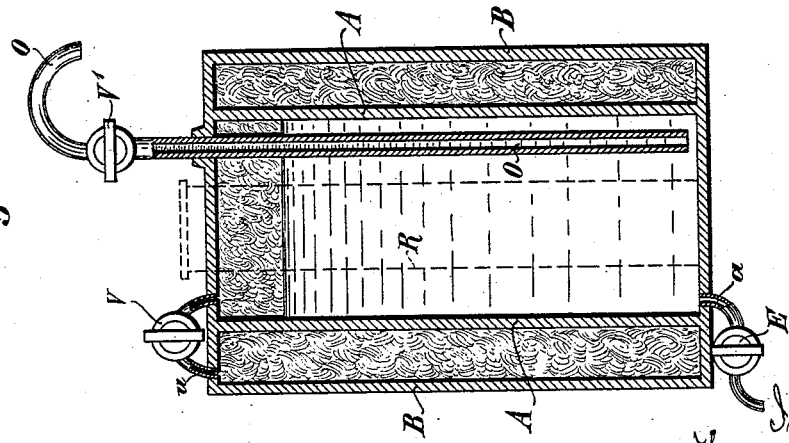
Witnesses
H. van Oldenneel
Otto Mulnk
Inventors
Heinrich Dräger
Bernhard Dräger
by
Attorney

UNITED STATES PATENT OFFICE.

HEINRICH DRÄGER AND BERNHARD DRÄGER, OF LUBECK, GERMANY, ASSIGNORS, BY MESNE ASSIGNMENTS, TO THE DEUTSCHE BIERFASS-AUTOMAT-GESELLSCHAFT, OF SAME PLACE.

RECEPTACLE FOR PRESERVING, TRANSPORTING, AND SELLING BEER, &c.

SPECIFICATION forming part of Letters Patent No. 572,248, dated December 1, 1896.

Application filed March 19, 1896. Serial No. 583,973. (No model.)

*To all whom it may concern:*

Be it known that we, HEINRICH DRÄGER and BERNHARD DRÄGER, manufacturers, citizens of the free town of Lubeck, residing at Lubeck, in the Empire of Germany, have invented new and useful Improvements in Vessels or Receptacles for the Preservation and Transport and the Sale on Draft of Beer and other Liquors, whereof the following is a specification.

Our invention relates to vessels or receptacles for the preservation, transport or shipment, and sale on draft of beer and other liquors; and the objects of our invention are, first, to enable the contents of the said vessels to be drawn off or discharged under the pressure of gas, such as carbonic-acid gas, carried by the vessel in an ordinarily-separated chamber; secondly, to permit of the utilization of the said carbonic-acid gas also as a means for isolating and protecting such liquor from injurious atmospheric influences, external shocks, and the like.

According to our invention apparatuses or appliances hitherto commercially employed for gradually drawing off or retailing beer and the like, such as carbonic-acid-gas siphons, carbonic-acid-gas receivers with the piping appertaining thereto, barrels or kegs with the accessory piping, coiled coolers, bar-taps, and so on, are, corresponding to the new purpose, modified and combined in such a manner as to obtain a handy and convenient vessel or receptacle, rendering the transport, preservation, and sale on draft of beer or other liquors simple and easy, the improved vessel or receptacle being filled with the liquor and the necessary quantity of gas (and ice, if required) before it leaves the brewery and being then ready for delivery at private houses or other establishments and for immediate use at any time.

A chief peculiarity of this invention is that the vessel, which actually contains the liquor it is desired to keep on draft, is wholly or partly incased in the receiver of gas under pressure, so that the liquor itself is effectually protected from any injury, either by shocks or vibration or through atmospheric influences, the free space or capacity of the receiver of gas being preferably equal to the inner capacity of the liquor-containing vessel, for the reason to enable gases at low pressure, that is to say, less than two atmospheres, to be utilized in filling the pressure-chamber and in producing the draft necessary for retailing the liquor.

A vessel or receptacle comprising these improvements is represented in the accompanying drawings, in which—

Figure 1 is a sectional elevation of the vessel; Fig. 2, a sectional elevation of a modified form thereof; and Figs. 3 and 4, drawn to a smaller scale, illustrate in sectional plan two forms of combination of the vessels or receivers incased one in the other.

The two chambers A and B—the one, A, forming the vessel for the liquor to be preserved or retailed, and the other, B, constituting the receiver for the gas under pressure—may be of cylindrical or any other suitable shape, the only essential condition being that the liquor-containing vessel A should be inclosed (see Fig. 3) or partly inclosed, as shown in Fig. 4, within the jacket B in such a manner that the intervening space between the said jacket and liquor-chamber forms a receptacle for storing and keeping in readiness the carbonic-acid gas, which is necessary to enable the liquor to be drawn off and which need be subjected to but small pressure, say less than two atmospheres. The capacity of the gas-receiver B is made nearly equal to that of the liquor vessel A in order to avert as far as possible any danger of bursting, and then in accordance with Mariotte's law the liquor may be evacuated by pipe *o* with the pressure of only one atmosphere. V' is a tap to draw off the liquor in retailing it or for other use, and for enabling a complete emptying of vessel A there is arranged an escape-valve E in the pipe *a*, as shown in Fig. 1.

As a rule, both the chambers A and B are entirely independent of and separated from each other, for convenience not only in cleaning the liquor-receptacle, but also in filling it with liquor and in filling the pressure-chamber with the gas, as these operations should be performed separately. Such an arrangement facilitates also the transport of the liquor by obviating any possibility of the gas under pressure being absorbed by the liquor—say, in consequence of concussions.

In those cases only where the pressure proves to be insufficient for drawing off the liquor more gas should be added to that contained in the jacket B. For this purpose a valve or cock V, arranged in a pipe $u$, communicating with both the chambers A B and adapted to be operated by hand, should be momentarily opened.

It is a characteristic of this invention that the chambers arranged in the manner described answer the additional purpose of affording a means for instantly counteracting any tendency of the gas-pressure to become neutralized by a transfer of gas to the liquor. Hence it follows that there at all times prevails in the gas-receiver a considerably higher pressure than that which exists in the liquor vessel.

Apart from accessory fittings the two vessels or chambers A and B when once combined preferably constitute one connected whole adapted to be bodily carried from place to place. Both vessels are preferably made of metal; but, if desired, the inner vessel may be arranged removable from the surrounding jacket and, moreover, may be made of glass, porcelain, enameled iron, or other similar substance.

A sufficient portion of the wall of the liquor vessel A may be left uncovered by the gas-receiver B for the purpose of fitting thereto the tap V' for drawing off the liquor, the gas-transferring valve V, or other accessory devices, such as the cooling-coil R (shown in dotted lines in Figs. 1 and 2) or the like.

The method of filling the two vessels or chambers with liquor and gas, respectively, forms no part of this invention, nor does it the method of discharging either of them, nor, indeed, the construction of any of the devices or fittings employed for these purposes separately considered.

The vessels may be provided with additional appliances, such as the particular circumstances of each case may require.

We are aware that prior to our invention receptacles have been made which consist of a double-walled vessel, both chambers thereof always being connected to equalize pressure and prevent the whole apparatus from exploding. We therefore do not claim such a combination broadly; but

What we claim as our invention, and desire to secure by Letters Patent, is—

In a transportable vessel for the preservation and the sale on draft of beer and other liquids, the combination of an inner chamber A and an outer chamber B containing gas of low pressure, and extending about the inner chamber, with an outer pipe $u$ connecting the chambers and the valve V in said connection for opening the pipe $u$, if required, substantially as described.

In testimony whereof we have hereunto set our hands in the presence of two subscribing witnesses.

HEINRICH DRÄGER.
    BERNHARD DRÄGER.

Witnesses:
 HEINR. PECKELHOFF,
 FRIEDR. PECKELHOFF.